(12) United States Patent
Mesnage et al.

(10) Patent No.: US 10,410,759 B2
(45) Date of Patent: Sep. 10, 2019

(54) CONDUCTIVE DEVICE INTENDED TO BE MOUNTED ON THE SURFACE OF PARTS MADE OF COMPOSITE MATERIALS

(71) Applicants: AIRBUS GROUP SAS, Blagnac (FR); Gerard Guilbert, Suresnes (FR)

(72) Inventors: Didier Mesnage, Saint Cloud (FR); Thierry Pelegrin, Viroflay (FR)

(73) Assignee: AIRBUS, Blagnac (FR)

( * ) Notice: Subject to any disclaimer, the term of this patent is extended or adjusted under 35 U.S.C. 154(b) by 3 days.

(21) Appl. No.: 15/527,900

(22) PCT Filed: Nov. 19, 2015

(86) PCT No.: PCT/EP2015/077122
§ 371 (c)(1),
(2) Date: May 18, 2017

(87) PCT Pub. No.: WO2016/079247
PCT Pub. Date: May 26, 2016

(65) Prior Publication Data
US 2018/0342332 A1    Nov. 29, 2018

(30) Foreign Application Priority Data
Nov. 21, 2014    (FR) ...................................... 14 61289

(51) Int. Cl.
*B29C 70/88* (2006.01)
*B32B 15/088* (2006.01)
(Continued)

(52) U.S. Cl.
CPC ......... *H01B 7/0009* (2013.01); *B29C 70/885* (2013.01); *B32B 15/088* (2013.01);
(Continued)

(58) Field of Classification Search
CPC ......... B29C 45/14221; B29C 45/14311; B29C 45/14811; B29C 70/88; B29C 70/885;
(Continued)

(56) References Cited

U.S. PATENT DOCUMENTS

| 3,757,029 | A | * | 9/1973 | Marshall | .................. | H01B 7/08 174/117 F |
| 4,746,389 | A | | 5/1988 | DiGenova | | |

(Continued)

FOREIGN PATENT DOCUMENTS

| CN | 1033140 A | 5/1989 |
| CN | 101663155 A | 3/2010 |

(Continued)

*Primary Examiner* — Timothy J Thompson
*Assistant Examiner* — Guillermo J Egoavil
(74) *Attorney, Agent, or Firm* — Im IP Law; C. Andrew Im; Chai Im

(57) ABSTRACT

A conductive device to form electrical connections on the surface of a structure made of composite material. The device includes a thin interface layer having a face via which the device is fixed to the surface of the structure made of composite material. A conductive metal element is placed on the face of the interface layer opposite the face making contact with the surface of the structure. The conductive element is configured to be able to undergo tensile and compressive stresses without damage. A protective layer is configured to protect the conductive element from attack from the environment surrounding the structure. These various elements are arranged relative to one another such that the length of the conductive element can vary as a function of temperature variations independently of the amplitude of the variations undergone by the structure on which the device is mounted.

8 Claims, 3 Drawing Sheets

(51) Int. Cl.
  *B32B 15/20* (2006.01)
  *H01B 7/00* (2006.01)
  *H01B 7/02* (2006.01)
  *H01B 7/04* (2006.01)
  *B64C 1/06* (2006.01)
  *B29K 105/24* (2006.01)
  *B29K 77/00* (2006.01)
  *B29K 309/08* (2006.01)
  *B29L 31/30* (2006.01)
  *B64C 1/00* (2006.01)

(52) U.S. Cl.
  CPC .............. *B32B 15/20* (2013.01); *B64C 1/06* (2013.01); *H01B 7/02* (2013.01); *H01B 7/04* (2013.01); *B29K 2077/00* (2013.01); *B29K 2105/243* (2013.01); *B29K 2309/08* (2013.01); *B29L 2031/3076* (2013.01); *B32B 2262/101* (2013.01); *B32B 2307/202* (2013.01); *B32B 2605/18* (2013.01); *B64C 1/00* (2013.01); *B64C 2001/0072* (2013.01); *Y02T 50/43* (2013.01)

(58) Field of Classification Search
  CPC .......... B29K 2077/00; B29K 2105/243; B29K 2309/08; B29L 2031/3076; B32B 5/18; B32B 7/06; B32B 15/08; B32B 15/088; B32B 15/20; B32B 27/065; B32B 27/08; B32B 27/32; B32B 27/34; B32B 27/36; B32B 38/1866; B32B 2262/101; B32B 2307/202; B32B 2605/18; B64C 1/06; B64C 1/00; B64C 2001/0072; H01B 7/00; H01B 7/0009; H01B 7/02; H01B 7/04; Y02T 50/43
  USPC ...................................... 174/119 R; 264/265
  See application file for complete search history.

(56) References Cited

U.S. PATENT DOCUMENTS

| | | | |
|---|---|---|---|
| 5,736,603 A * | 4/1998 | Pfeiffer | C08K 9/08 252/511 |
| 8,206,823 B2 | 6/2012 | Schaaf et al. | |
| 8,927,911 B2 | 1/2015 | Short | |
| 9,643,734 B2 | 5/2017 | Burgess et al. | |
| 2010/0124659 A1 | 5/2010 | Nelson et al. | |
| 2010/0147460 A1 | 6/2010 | Lefebure | |
| 2011/0278395 A1 | 11/2011 | Telgkamp et al. | |
| 2016/0207234 A1* | 7/2016 | Krahnert | B32B 15/08 |

FOREIGN PATENT DOCUMENTS

| | | |
|---|---|---|
| CN | 102006995 A | 4/2011 |
| CN | 102474913 A | 5/2012 |
| CN | 104058086 A | 9/2014 |
| DE | 102007040011 A1 | 2/2009 |
| FR | 1 544 107 A | 10/1968 |
| FR | 2 909 919 A1 | 6/2008 |

\* cited by examiner

CONDUCTIVE DEVICE INTENDED TO BE MOUNTED ON THE SURFACE OF PARTS MADE OF COMPOSITE MATERIALS

RELATED APPLICATIONS

This application is a § 371 application from PCT/EP2015/077122 filed Nov. 19, 2015, which claims priority from French Patent Application No. 14 61289 filed Nov. 21, 2014, each of which is incorporated herein by reference in its entirety.

FIELD OF THE INVENTION

The invention pertains to the general field of means making it possible to integrate conducting elements such as cables, metallic braids or strips of metal foil onto the surface of parts or structures made of composite materials, in order to produce electrical links.

It also pertains to the field of the integrity checking of such structures and of the detection of damage following shocks applied to their surface.

BACKGROUND OF THE INVENTION

Nowadays we are witnessing ever more significant integration of non-metallic materials (composites, plastics, etc.) in certain structures, structures of aircraft elements for example. The object of employing such materials is to reduce the weight of such structures as well as their cost of fabrication with respect to similar structures made of metal.

However, this substitution of materials gives rise to problems linked with the low electrical conductivity of the composite materials used, or even with their absence of conductivity.

Accordingly, such materials do not make it possible to ensure sufficient electrical conductivity making it possible to produce electrical links ensuring functions such as the return of current in an aircraft. To alleviate this functional deficiency, one is generally constrained to provide for the installation, on the surface of the composite structure considered, of conductors as well as of elements ensuring the fixing of these conductors to the structure and the interconnection of these conductors with those carried by neighboring structures.

However, such a solution penalizes the equipment in which the structure is integrated, as much in terms of weight as in terms of bulkiness or production time. These drawbacks take on particular significance when dealing with aircraft structures.

Furthermore, assembling a standard electrically conducting element, such as a monolithic conductor like a metallic wire or a strip, or else such as a conductor formed of a one-dimensional arrangement of conductors such as for example a multistrand electrical cable, with a structure made of composite material, may furthermore bring about mechanical stresses imposed on the conducting element. These stresses are due in particular to the differential expansions which occur at the level of the materials constituting the various assembled elements when the structure is subjected to significant temperature variations. Such is for example the case for civil aircraft structures which are subjected to temperatures that may range from −45° C. to +70° C., or else for space launcher structures which are subjected to temperatures that may range from −60° C. to +200° C. They are also due, to a lesser extent, to the installing of conductors on structures not necessarily having plane shapes.

Moreover, this substitution of materials also gives rise to problems linked with the integrity checking of the structures considered. Indeed, when a composite material structure undergoes a "low-energy" impact, due to the dropping of a tool, for example, the internal damage caused by the shock may appreciably reduce the mechanical performance of the structure, even though the detection of this damage by simple visual inspection is almost impossible, in contradistinction to the case of a metal structure.

However, there does not exist to date any known solution making it possible to directly integrate current-conducting elements with a composite structure while limiting the mechanical stresses imposed on said conductors, which stresses are generated by the shrinking or the stretching of the composite structure when it is thermally loaded and making it possible at the same time to note by simple visual inspection the possible presence of an impact zone on the surface of the structure.

Moreover, the impact resistance of composite material structural elements is taken into account by design offices, but leads to an overdimensioning of the structure with respect to the simple need for mechanical strength. This overdimensioning, the aim of which is to strengthen the resistance of these structural elements to an impact, does not allow definitive visual detection of a low-energy impact that may have damaged the structural element concerned.

The present concept is aimed at alleviating these drawbacks.

OBJECT AND SUMMARY OF THE INVENTION

An aim of the invention is therefore to propose a solution making it possible to mount a conducting element on the surface of a non-conducting structure without this mounting causing the aforementioned drawbacks.

For this purpose, the subject of the invention is a conducting device for the installing of an electrical link on the surface of a composite material structure which comprises the following elements:
- an interface layer of small thickness exhibiting a face by which the device is fixed to the surface of the composite material structure;
- a conducting metallic element, placed on the face of the interface layer opposite to the face in contact with the surface of the structure, said element being configured so as to be able to undergo compressive and extensile stresses without damage; and
- a protective layer configured to protect the conducting element from the attacks of the medium surrounding the structure.

According to the invention, these various elements are arranged with respect to one another in such a way that the length of the conducting element can vary as a function of the variations in length that may affect the interface layer and the protective layer.

According to diverse provisions optionally used in conjunction, the device according to the invention can exhibit diverse complementary characteristics. Thus:

According to a characteristic of the device according to the invention, the protective layer consists of an envelope covering the portion of the device in contact with the exterior medium, said envelope defining with the interface layer an internal space in which the conducting element is housed.

According to another characteristic, the protective layer consists of a surface treatment applied to the conducting element.

According to another characteristic, the interface layer is made of composite material or of elastomer.

According to another characteristic, the protective layer is made of elastomer.

According to another characteristic, the protective layer is made of composite material so as to exhibit, in case of low-energy impact, a deformation visible by an observer in the zone of the impact.

According to another characteristic, the conducting element is a metallic braid.

According to another characteristic, the conducting element is set of superposed leaves of foil material.

According to another characteristic, the interface layer and the protective layer being made of composite material, the fabrication of the device comprises a pre-polymerization operation, so that at the end of fabrication the device takes the form of a semi-finished flexible product whose total polymerization can be carried out after mounting of the device on the composite material structure considered.

According to another characteristic, the interface layer being made of elastomer, the fabrication of the device comprises a vulcanization operation, so that at the end of fabrication the device takes the form of a flexible product whose mounting on the composite material structure considered can be carried out an appropriate means of assembly.

The invention makes it possible to circulate an electrical current or a signal as close as possible to the structure concerned, while ensuring that impacts are revealed, and limits the mechanical stresses generated during thermomechanical loading or during installation on a non-plane structure. It applies advantageously to any composite or plastic part and more particularly to the constituent elements of aircraft or of launchers.

DESCRIPTION OF THE FIGURES

The characteristics and advantages of the invention will be better appreciated by virtue of the description which follows, which description is based on the appended figures which present.

DETAILED DESCRIPTION

The device 11 according to the invention takes the form of a semi product consisting of the following elements:
a conducting element 12 of given cross section,
a layer 13 of an insulating interface material on which the conducting element 12 is placed;
a surface cladding 14 forming a protection, covering the portion of the external surface of the device 11 in direct contact with the exterior medium.

The whole takes on the aspect of a conducting strip exhibiting a small thickness with respect to its length, which thickness is determined chiefly by the cross section of the conducting element 12.

Figure 1:
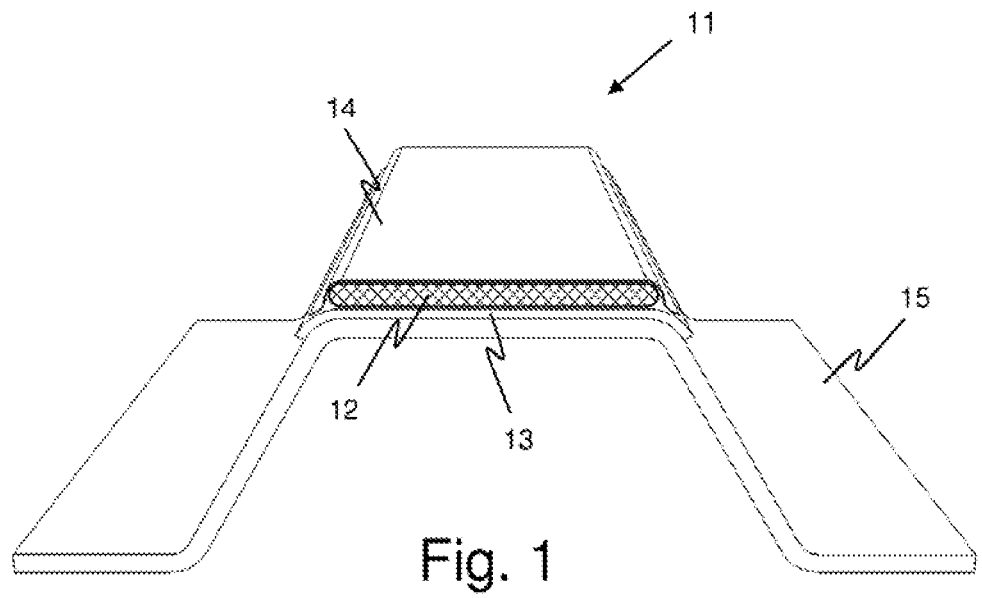
FIG. 1, a longitudinal view from above of an exemplary implementation of the device according to the invention.
Figure 2:
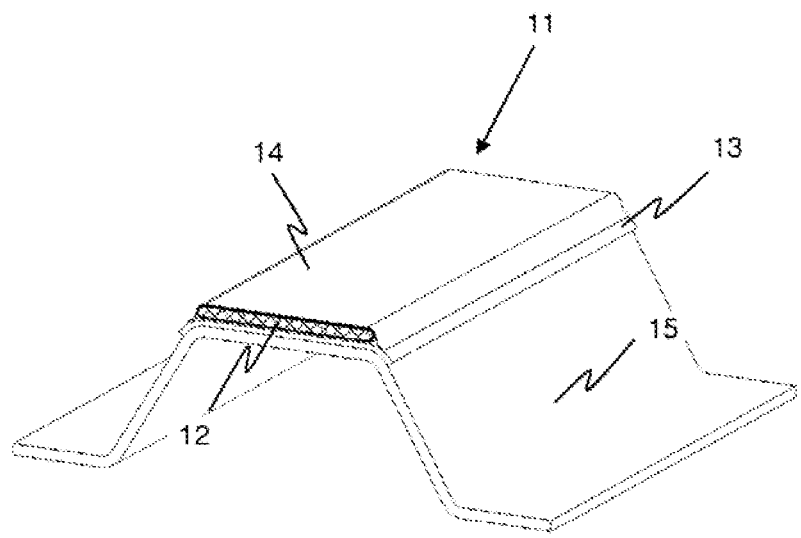
FIG. 2, a lateral perspective view of the exemplary implementation of FIG. 1.

Here, semi product is understood to mean that the device 11 is not envisaged to be used alone but rather, as illustrated by FIGS. 1 and 2, integrated with a support structural element 15, whose functionalities it complements, from an essentially electrical point of view. The structural element 15 is for example a composite material element such as an aircraft structural element for example.

The face of the interface layer 13 of the device 11 which is intended to be fixed on the composite structure 15 is configured in such a way that, once produced, the device 11 according to the invention can be fixed to the surface of a composite structure 15 by any appropriate means, by cold or hot gluing onto the already fabricated structure 15 or else by surface integration, during the fabrication of this structure.

According to the invention the conducting element is a metallic element of significant length compared with its cross section, and is configured and arranged so as to be able to support without damage the mechanical stresses that it is obliged to undergo on account of its elongation or contraction due to the temperature variations undergone.

Figure 3:
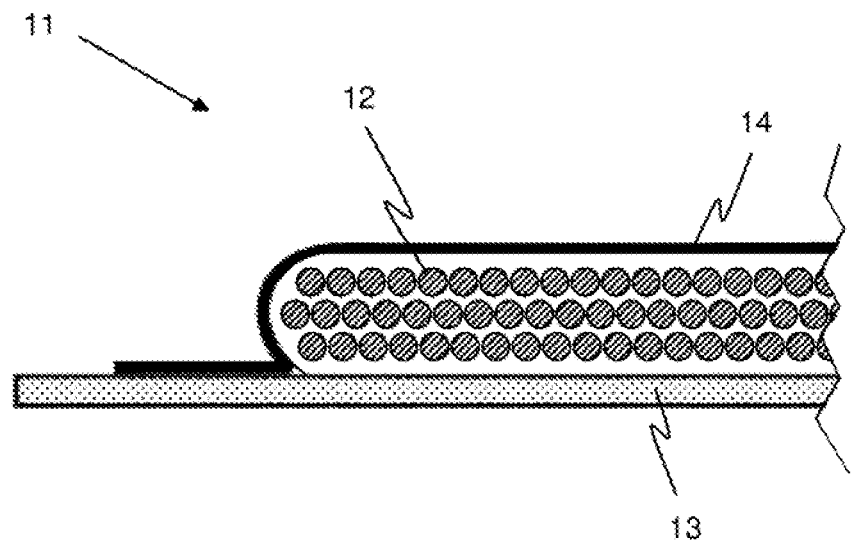
FIG. 3, a detailed partial view of the device according to the invention according to a first embodiment.
Figure 4:
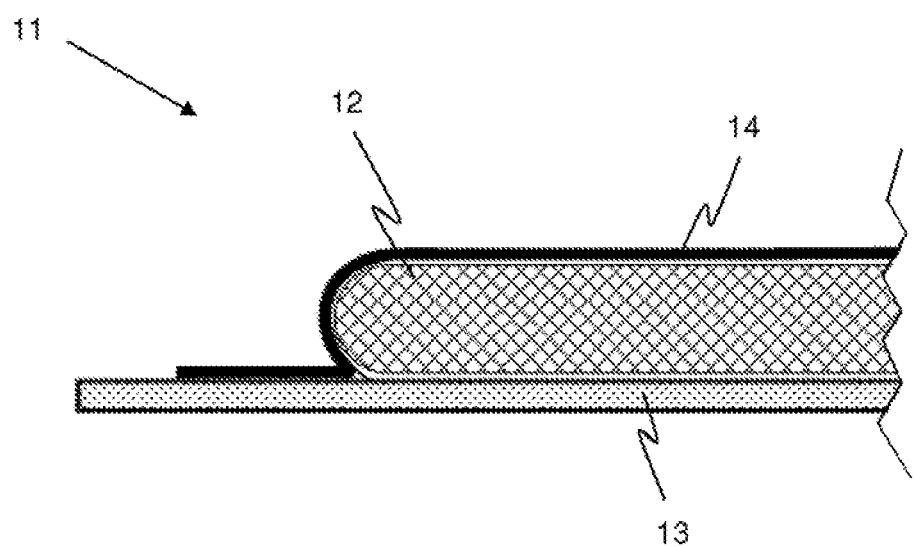
FIG. 4, a detailed partial view of the device according to the invention according to a second embodiment.

With this aim, it preferentially consists of a metallic braid as illustrated by FIG. 4 or of a conductor formed of a superposition of metal foil leaves or else consists of a juxtaposition of conducting wires, as illustrated by FIG. 3. However, it may alternatively consist of other electrically conducting elements such as a multistrand electrical cable for example (copper, aluminum, etc.) arranged for this purpose on the interface layer 13.

The layer 13 of interface material makes it possible at one and the same time to carry out the linking of the device 11 to the structure 15 and to produce the insulation of the conducting element 12, the braid or the cable, of the composite material, so as to avoid possible problems of galvanic coupling that may arise between the composite material, a material based on carbon fibers in particular, and the material constituting the conducting element 12, aluminum in particular.

The interface material layer furthermore advantageously makes it possible to separate the conductor 12 forming the device 11 from another conductor that may be situated in proximity or crossing its path and as a consequence to protect the conductor 12 from disturbing elements and to ensure the maintaining of electromagnetic compatibility (EMC) with the surrounding elements.

According to the nature and the mechanical properties of the composite material forming the structure 15, the layer 13 of interface material can consist of an elastomer material exhibiting given mechanical and/or temperature behavior characteristics or, alternatively, of one or more layers of a composite material chosen for its electrical insulation characteristics or else for its similarity of temperature behavior with the composite material constituting the structure 15 on which the device 11 is mounted.

The protective layer 14 makes it possible, for its part, to protect the conducting element 12 from the diverse attacks committed by the exterior environment (abrasion, corrosion, etc.).

Accordingly, depending on the embodiment considered, the protective layer 14 can consist, as illustrated more particularly by the partial views of FIGS. 3 and 4, of a genuine cladding made of elastomer material or composite material which, together with the interface layer 13, defines a space in which the conducting element is housed in such a way that it can undergo without constraint an increase in length or a constriction.

Within the framework of FIG. 3, the conducting element consists of a plurality of wires disposed in the space delimited by the cladding layer 14 and the interface layer 13.

In the case of FIG. 4 which constitutes a preferred embodiment of the device according to the invention, the conducting element 12 consists of a metallic braid.

Alternatively, the cladding layer 14 can consist of a simple chemical surface treatment (deposition or varnish) of the material constituting the conducting element 12, the latter then being fixed to the interface layer 13 by its face in contact with the latter.

The surface cladding layer 14 may moreover be chosen for certain types of applications so as to make it possible, on account of its nature and its thickness, to reveal the impacts of shocks that may have occurred in the course of the use of the structure 15. In this case, the cladding layer 14 is made of a material capable of deforming in the impact zone (marking of the impact on the surface), due to a shock, a shock of low kinetic energy in particular. For this purpose, it may then consist of a relatively fine layer of stratified rigid material, a glass or composite material ply coated with resin for example.

It should be noted that the connection of the conducting element 12, braid, foil leaves or cable, with other electrical elements can advantageously be carried out with existing connectors, and this will make it possible to adapt to the materials (aluminum, copper, etc.), to the environment (certifications, existing connection fitting, etc.) and to the needs (cross section varying as a function of the intensity of the current, etc.)

As it is described in the preceding text, the device according to the invention exhibits numerous advantages. Thus:

It makes it possible to eliminate the fixing elements required for holding a conductor on the surface of the structure 15 considered, thereby advantageously making it possible to free up space, and to achieve savings in weight and in installation time. Dispensing with the elements for holding the conductor 12 on the carrier structure advantageously makes it possible to significantly reduce, for any fabricated and equipped structure, the number of references to be managed with regard to conductor fixings.

it also makes it possible to limit the mechanical stresses that may be imposed on the conducting element 12 by the composite structure 15 to which it is fixed, by allowing in particular the conducting element 12 to elongate or to shrink as a function of temperature variations, independently of the contraction or expansion movements followed by the composite structure 15 under the action of the same temperature variations, or else as a function of mechanical stresses linked in particular with the installing of the device on the composite material structure 15. The limitation of the mechanical stresses imposed on the conductor 12 is here advantageously rendered possible by acting, according to the structure of the conducting element, in particular on the bendability of the braid 41 or on the slippage of the various wires 31 or that of the mutually superposed foil leaves, as well as on the arrangement of the conducting element 12 within the device.

It further makes it possible, in the case where the cladding layer 14 is fabricated with this intention (composite material layer), to reveal upon visual inspection impacts revealing the existence of low-energy, less than 30 J, shocks (dropping of tools, etc.) that might have affected the composite structure 15, through the deformation of the braid or of the metal foil leaves forming the conducting element 12 and the breaking and/or the damaging of the protective layer 14.

It further makes it possible to strengthen the capacity for absorption of the impact energy transmitted during a low-energy shock, the material of the interface layer 13 and the structure of the conducting element 12 contributing to the absorption of the impact energy. A redimensioning of the support structural part 15 of the conducting element 12 can thus be carried out so as to optimize the integration of the device 11 in the structure so as to benefit from a saving in weight and increased ease of integration of the device 11 away from the assembly line.

The device according to the invention also makes it possible, in an advantageous manner, to preserve a standard connection fitting to hook the conducting element mounted on the structure considered up to the conducting elements of other structures.

It further makes it possible to superpose several conductors by forming superposed layers so as to multiply, in one and the same small volume, the number of electrical signals that may be conveyed and/or the electrical power transported. In an analogous manner, and for the same reasons, it also makes it possible to juxtapose several conductors, each conductor being electrically insulated from its neighbor and mechanically separated from the latter.

Figure 5:
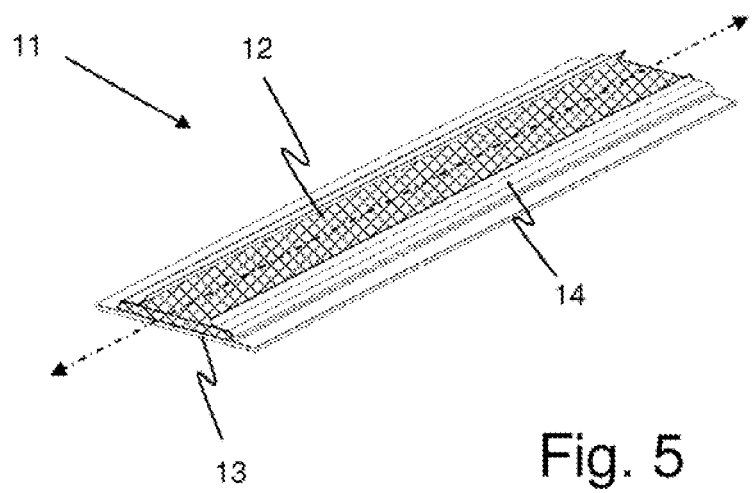
FIG. 5, a perspective view of the device according to the invention according to the embodiment of FIG. 4, on which the protective cladding is partially longitudinally cut away.
Figure 6:
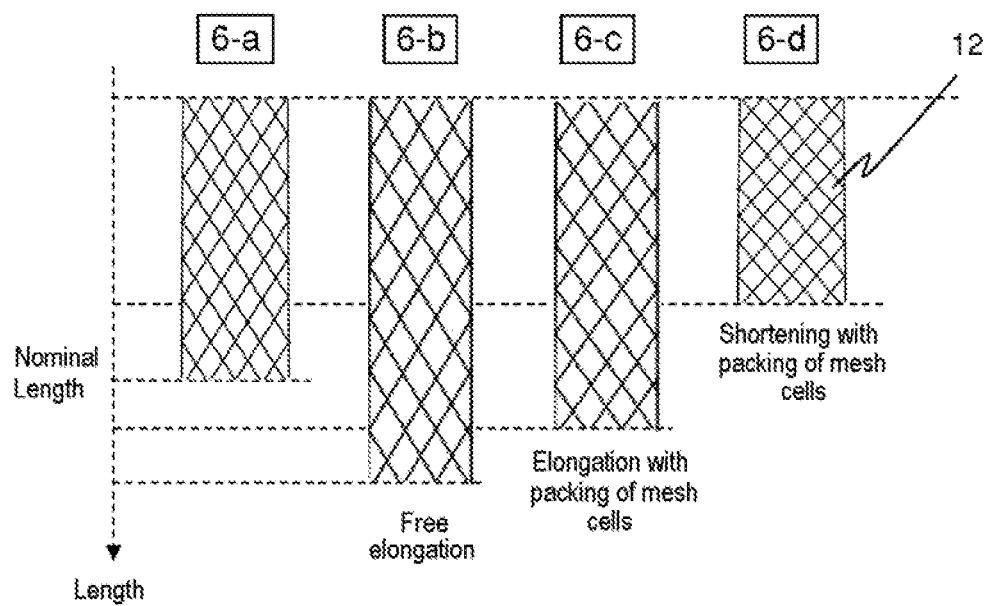
FIG. 6, a schematic illustration of the structural properties of the device according to the invention according to the embodiment of FIGS. 4 and 5.

FIGS. 5 and 6 illustrate the advantageous mechanical properties of the device according to the invention through an exemplary embodiment for which the latter comprises an interface layer 13, a conducting element 12 consisting of a metallic braid, as well as a protective layer 14 consisting of a material layer defining together with the interface layer 13 a longitudinal cavity inside which the conducting element 12 is placed. In the illustration of FIG. 5, the surface of the protective layer is partially cut away so as to allow the conducting braid 12 to be seen.

Thus, positioned within the device 11 of which it forms part, the conducting braid 12 can freely adopt a stretched or compressed position, without undergoing damage, the compressed or stretched position being due for example to temperature variations.

FIG. 6 illustrates various configurations demonstrating the advantages of the device according to the invention.

View 6-*a* represents in a schematic manner the situation at ambient temperature, for which situation the length of the braid and that of the structure are in principle adapted to one another.

View 6-*b* represents a situation for which the structure 15 and the braid 12 have undergone an expansion under the action of an increase in the temperature, the expansion of the structure 15 along the axis of the braid being substantially equal to the expansion of the material constituting the braid (metal). In this context the braid simply undergoes an elongation of its length by widening of its mesh cells, which elongation absorbs by itself the effects of the expansion of the metal.

View 6-*c* represents a situation for which the structure 15 and the braid 12 have undergone an expansion under the action of an increase in the temperature, the expansion of the structure 15 along the axis of the braid being smaller than the expansion of the material constituting the braid (metal). In this context the braid 12 undergoes at one and the same time an elongation of its length which partially absorbs the effects of the expansion of the metal as well as a compression which is manifested by a (tightening of the mesh cells) and which allows the braid 12 to absorb without damage the gap in expansion between the composite material constituting the structure 15 and the metal of which it consists. This tightening movement is advantageously rendered possible by the relative freedom of movement available to the braid 12 inside the structure of the device according to the invention.

View 6-*d* represents a situation for which the structure 15 and the braid 12 have undergone a contraction under the action of a fall in the temperature. In this context the metal constituting the braid 12 undergoes a contraction which causes a shortening of its length and/or a compression which results in a tightening of the mesh cells, depending on whether or not the contraction of the metal of the braid 12 and that of the composite material of the structure 15 have similar values.

Thus, by virtue of the use of the device according to the invention, the conducting element 12 is at one and the same time linked with the composite structure 15 and capable of adapting its dimensions to the expansions and to the contractions due to the temperature variations independently of the variations undergone by the structure itself.

From the production point of view, the semi-product constituted by the device according to the invention forms the subject of a fabrication method comprising chiefly the following steps:

a first step of producing the interface layer, this layer, which is insulating from the electrical point of view, being made, according to the mechanical properties sought, of composite material (glass fiber) or alternatively of polymer material (elastomer, polyamide, etc.);

a second step of integrating the conducting element (braid or strips of metal foil for example) on the interface layer;

a third step of installing the protective layer, which layer may take, according to the mechanical properties sought, the form of a protective membrane made of polymer material or else the form of a ply made of composite material.

It should be noted that according to the materials used to form the interface layer and the protective layer, layer of composite material or layer of polymer material, a polymerization or vulcanization operation can be performed on completion of the second or the third step.

Thus, if the interface layer and the protective layer are made of composite material, a polymerization operation can be performed on completion of the third step. In this case, depending on whether or not it is desired that the device retain a flexible structure, the polymerization may be partial (pre-polymerization) or complete.

Thus again, if the interface layer and the protective layer are made of elastomer material, a vulcanization operation can be performed on completion of the third step.

Thus again, if the interface layer is made of composite material and the interface layer of elastomer material, a polymerization operation can be performed on completion of the second step and a vulcanization operation can be performed on completion of the third step.

It should also be noted that in the course of the polymerization and/or vulcanization operations occurring in the course of the fabrication of the device according to the invention, it is possible that, in certain cases, surface adhesion of the interface layer 13 and/or of the protective layer 14 to the conducting element 12 may occur, this adhesion possibly limiting in a prejudicial manner the freedom of movement of the conducting element 12. Accordingly, to forestall this adhesion it is possible to interpose a separation layer preventing direct contact of the surface of the conducting element with the interface and protective layers. This layer may for example consist of a film of an appropriate material shrouding the conductor, or else of an appropriate treatment of the surface of the conducting element.

It should further be noted that the third step of installing a protective layer can consist of a surface treatment of the conducting element, a chemical treatment or a deposition of a protective varnish on the surface of the device in contact with the exterior medium. In this case, the latter step can be carried out while mounting the device on the composite material structure 15 considered.

On completion of the above steps, the semi-product thus obtained can then be equipped with an appropriate connection fitting.

The device thus produced forms a conducting structure enclosing a shrouded conducting element, this structure constituting a semi-product that can be stored and used subsequently for the fabrication of a composite structure integrating surface electrical conductors.

The installing of the device 11 according to the invention on the composite structure 15 considered and its fixing to said structure can be carried out by various means depending on whether assembly is performed at the time of the fabrication of the composite material part or else after fabrication.

Thus, the use of a device 11 whose interface layer 13 is made of pre-polymerized composite material or of elastomer material makes it possible for example to assemble the device according to the invention on the composite material structure 15 considered at the end of the production of the latter, the complete polymerization of the interface layer 13 then being carried out simultaneously with the polymerization of the structure 15 itself. The polymerization operation causes the interface layer to adhere to the composite material of the structure and so ensures the fixing of the device to the structure.

However, the mounting of the device according to the invention on the composite material structure considered can further be carried out after separate complete fabrication of the two elements and assembly by any appropriate known means, for example by gluing the device 11 onto the structure 15 by means of a film of glue.

It should be noted that the fabrication of the device according to the invention, comprising the insulating interface layer 113, the conducting element 12 (the braid or the foils) and the, impact revealing, protective layer 14, as well as its fixing onto the composite material structure 15, call upon known and proven processes (for example: RTM injection, polymerization in an oven, gluing, crimping, etc.), with no industrial risk (current products, very widespread methods).

As emerges from the above description, the device according to the invention can advantageously be used in numerous fields, such as the construction of aircraft (aeronautical, aerospace), of trains, of automobiles, or else such as the building industry, or the fabrication of electronic packages, for applications requiring the integration of electrical functions with a non-conducting structure (signal transit in a plastic, etc.).

It can be used, in particular, for the production of structural or overlay elements in the fields cited above in order to replace existing systems. It can in particular, in the field of aircraft structures, replace a conventional ESN ("Electrical Structural Network") network, consisting of a set of cables, metallic parts and clamping collars, and makes it possible to save weight, installation time of the components and consequently cost.

The invention claimed is:

1. A conducting device to install an electrical link on a surface of a composite material structure, comprising:
    an interface layer exhibiting a face by which the conductive device is fixed to the surface of the composite material structure;
    a conducting metallic element located on the face of the interface layer opposite to a face in contact with the surface of the composite material structure, said conducting metallic element being configured to undergo compressive and extensile stresses without damage;
    a protective layer configured to protect the conducting metallic element from attacks of an exterior medium surrounding the composite material structure;
    wherein the interface layer is made of a composite material and the conducting device fabricated and mounted on the composite material structure is a semi-finished flexible product, a fabrication of the conducting device comprises a pre-polymerization operation such that a total polymerization of the conducting device is performed post-mounting of conducting device on the composite material structure; and
    wherein said conducting metallic element is a metallic braid.

2. The conducting device as claimed in claim 1, wherein the protective layer comprises an envelope covering a portion of the conducting device in contact with the exterior medium, said envelope defining with the interface layer, an internal space in which the conducting metallic element is housed.

3. The conducting device as claimed in claim 1, wherein the protective layer is made of a composite material to exhibit a deformation visible by an observer in a zone of a low-energy impact.

4. The conducting device as claimed claim 1, wherein the conducting element is a set of superposed leaves of foil material.

5. A conducting device to install an electrical link on a surface of a composite material structure, comprising:
    an interface layer exhibiting a face by which the conductive device is fixed to the surface of the composite material structure;
    a conducting metallic element located on the face of the interface layer opposite to a face in contact with the surface of the composite material structure, said conducting metallic element being configured to undergo compressive and extensile stresses without damage;
    a protective layer configured to protect the conducting metallic element from attacks of an exterior medium surrounding the composite material structure;
    wherein the interface layer is made of an elastomer and the conducting device fabricated and mounted on the composite material structure is a semi-finished flexible product, a fabrication of the conducting device comprises a vulcanization operation such that a total polymerization of the conducting device is performed post-mounting of conducting device on the composite material structure; and
    wherein the conducting metallic element is a metallic braid.

6. The conducting device as claimed in claim 5, wherein the protective layer comprises an envelope covering a portion of the conducting device in contact with the exterior medium, said envelope defining with the interface layer, an internal space in which the conducting metallic element is housed.

7. The conducting device as claimed in claim 5, wherein the protective layer is made of a composite material to exhibit a deformation visible by an observer in a zone of a low-energy impact.

8. The conducting device as claimed claim 5, wherein the conducting element is a set of superposed leaves of foil material.

* * * * *